J. W. LAWRENCE.
Securing Felly-Joints.
No. 68,999. Patented Sept 17, 1867.
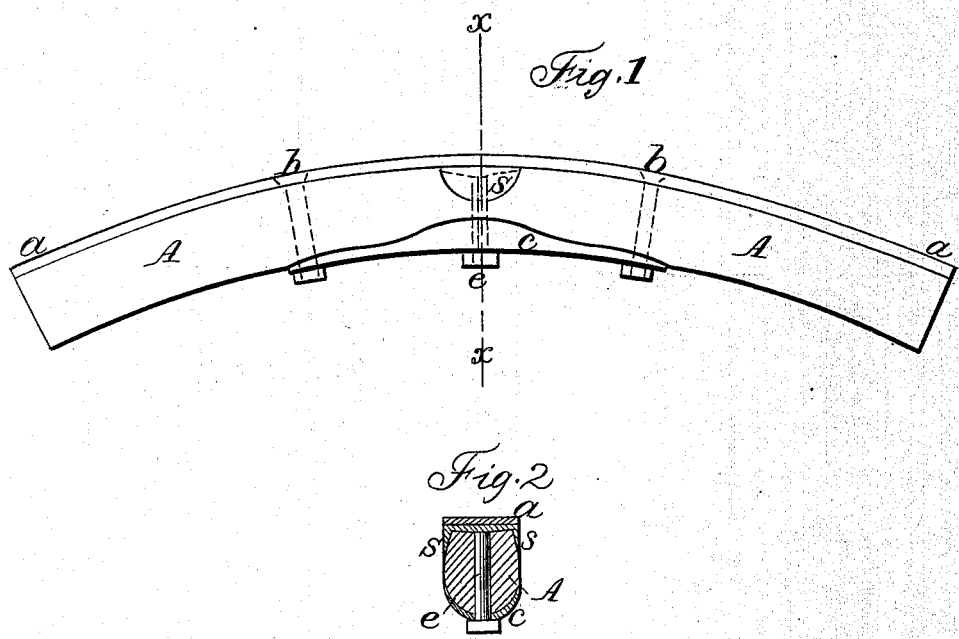

United States Patent Office.

JAMES W. LAWRENCE, OF NEW YORK, N. Y., ASSIGNOR TO BREWSTER AND COMPANY, OF THE SAME PLACE.

Letters Patent No. 68,999, dated September 17, 1867.

IMPROVED MODE OF SECURING FELLOE-JOINTS.

The Schedule referred to in these Letters Patent and making part of the same.

TO ALL WHOM IT MAY CONCERN:

Be it known that I, JAMES W. LAWRENCE, of the city, county, and State of New York, have invented a new and improved Mode of Securing Felloe-Joints; and I do hereby declare that the following is a full, clear, and exact description thereof, which will enable others skilled in the art to make and use the same, reference being had to the accompanying drawings, forming part of this specification, in which—

Figure 1 is a side view of a section of wheel-felloes, showing my improved mode of joining the ends.

Figure 2 is a transverse section taken through the joint on the line $x$ $x$, fig. 1.

Similar letters of reference indicate like parts.

The nature of this invention consists in securing the ends of felloes in a wheel by means of a bolt through the joint and the felloe-plate in such manner that the ends will not split or crack when the tire is set up, nor work loose and uneven laterally and radially from service, but will form a tight joint of great strength and durability.

A A represent sections of felloes, and $a$ the tire secured to them, as usual, by screw-bolts $b$ $b$, having their heads countersunk in the tire and their ends fastened by nuts on the felloe-plate $c$. A bolt, $e$, is also put through the joint at the ends of the felloes A A passing through the felloes-plate $c$, to which it is secured by a nut, or it may be riveted thereto. The bolt $e$ is made by preference with a flat T-head lying upon the felloes under the tire, and having lips $s$ $s$, which are turned down on the sides of the felloes, to be flush or nearly flush therewith, as shown in the drawings. The bolt may be made like the bolts $b$ $b$, to pass through the tire, but this method would be only partially effective in securing the ends of the felloes.

In the old mode of securing the felloes with the bolts $b$ $b$ only, the felloe-plate is made shorter, in order to bring the bolts to bear nearer to the joint, but by my improved method the felloe-plate can be made longer, and the bolts be set further apart, having a wider bearing and much greater strength.

Having described my invention, I claim as new, and desire to secure by Letters Patent—

The T-headed bolt $e$, constructed as described, for securing felloe-joints laterally and radially, substantially as and for the purposes herein described.

The above specification of my invention signed by me this 25th day of May, 1867.

JAMES W. LAWRENCE.

Witnesses:
WM. F. MCNAMARA,
ALEX. F. ROBERTS.